United States Patent
Ghosh et al.

(10) Patent No.: US 10,303,678 B2
(45) Date of Patent: May 28, 2019

(54) APPLICATION RESILIENCY MANAGEMENT USING A DATABASE DRIVER

(71) Applicant: International Business Machines Corporation, Armonk, NY (US)

(72) Inventors: Sujan S. Ghosh, Bangalore (IN); Vinayak Joshi, Bangalore (IN); Shilu Mathai, Bangalore (IN); Michael R. Springgay, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 15/196,033

(22) Filed: Jun. 29, 2016

(65) Prior Publication Data
US 2018/0004797 A1    Jan. 4, 2018

(51) Int. Cl.
*G06F 16/00*    (2019.01)
*G06F 17/30*    (2006.01)
(Continued)

(52) U.S. Cl.
CPC ........ *G06F 16/2365* (2019.01); *G06F 11/30* (2013.01); *G06F 16/2308* (2019.01);
(Continued)

(58) Field of Classification Search
CPC ........ G06F 17/30088; G06F 17/30362; G06F 17/30445; G06F 17/30286;
(Continued)

(56) References Cited

U.S. PATENT DOCUMENTS 5,287,501 A * 2/1994 Lomet ................ G06F 11/1474
707/648
5,893,128 A * 4/1999 Nauckhoff ............ G06F 9/466
715/210
(Continued)

OTHER PUBLICATIONS

Tulloch, Mitch; "Application Resiliency in Virtualization Environments"; VirtualizationAdmin.com; <http://www.virtualizationadmin.com/articles-tutorials/general-virtualization-articles/application-resiliency-virtualization-environments.html>; Apr. 2, 2014.
(Continued)

*Primary Examiner* — Srirama Channavajjala
(74) *Attorney, Agent, or Firm* — Erik K. Johnson

(57) ABSTRACT

Disclosed aspects relate to using a database driver to manage application resiliency with respect to a shared pool of configurable computing resources. A transaction request having a set of command data is received. The set of command data for the transaction request is captured in a memory device coupled with the database driver. The transaction request is connected with a first asset of the shared pool of configurable computing resources. An error event is detected related to the first asset. It is ascertained that the error event indicates a configuration for an automatic client reroute (ACR) operation. Using the ACR operation, the transaction request is connected with a second asset of the shared pool of configurable computing resources. The set of command data for the transaction request is transmitted from the memory device coupled with the database driver to the second asset.

12 Claims, 8 Drawing Sheets

(51) Int. Cl.
*G06F 16/23* (2019.01)
*G06F 16/242* (2019.01)
*G06F 16/2455* (2019.01)
*G06F 16/245* (2019.01)
*G06F 16/2453* (2019.01)
*G06F 11/30* (2006.01)

(52) U.S. Cl.
CPC ........ *G06F 16/2379* (2019.01); *G06F 16/242* (2019.01); *G06F 16/245* (2019.01); *G06F 16/2433* (2019.01); *G06F 16/2453* (2019.01); *G06F 16/2455* (2019.01); *G06F 17/30371* (2013.01); *G06F 17/30377* (2013.01)

(58) Field of Classification Search
CPC ......... G06F 17/30557; G06F 17/30165; G06F 11/2074; G06F 11/1662; G06F 11/1471; G06F 16/2365; G06F 16/2379; G06F 16/2455; G06F 16/2433; G06F 16/245; G06F 16/2308; G06F 16/2453; G06F 17/30371; G06F 17/30377
See application file for complete search history.

(56) References Cited

U.S. PATENT DOCUMENTS

| | | | | |
|---|---|---|---|---|
| 6,453,322 | B1* | 9/2002 | DeKimpe | G06F 17/30595 |
| 8,799,216 | B1* | 8/2014 | McCline | G06F 17/30575 |
| | | | | 707/610 |
| 9,235,464 | B2 | 1/2016 | Neerincx et al. | |
| 2003/0120643 | A1* | 6/2003 | Bird | G06F 17/30286 |
| 2003/0200197 | A1* | 10/2003 | Long | H04L 29/06 |
| 2004/0039962 | A1* | 2/2004 | Ganesh | G06F 11/1474 |
| | | | | 714/16 |
| 2004/0181560 | A1* | 9/2004 | Romanufa | G06F 17/30371 |
| 2005/0108537 | A1* | 5/2005 | Puri | G06F 21/6227 |
| | | | | 713/176 |
| 2005/0138375 | A1* | 6/2005 | Sadjadi | G06F 17/30362 |
| | | | | 713/167 |
| 2006/0010180 | A1* | 1/2006 | Kawamura | G06F 11/2074 |
| 2006/0167883 | A1* | 7/2006 | Boukobza | G06F 17/30557 |
| 2008/0034014 | A1* | 2/2008 | Beck | G06F 17/30575 |
| 2009/0077135 | A1* | 3/2009 | Yalamanchi | G06F 17/30359 |
| 2009/0216813 | A1* | 8/2009 | Olivieri | G06F 17/30368 |
| 2009/0235255 | A1* | 9/2009 | Hu | G06F 9/466 |
| | | | | 718/101 |
| 2011/0047413 | A1 | 2/2011 | McGill et al. | |
| 2011/0153681 | A1* | 6/2011 | Peng | H04L 29/12047 |
| | | | | 707/803 |
| 2011/0213753 | A1 | 9/2011 | Manmohan | |
| 2012/0109895 | A1* | 5/2012 | Zwilling | G06F 11/1471 |
| | | | | 707/648 |
| 2012/0166407 | A1* | 6/2012 | Lee | G06F 9/466 |
| | | | | 707/703 |
| 2013/0297566 | A1 | 11/2013 | Colrain et al. | |
| 2013/0318058 | A1* | 11/2013 | Fries | G06F 17/30864 |
| | | | | 707/703 |
| 2014/0129873 | A1* | 5/2014 | McGill | G06F 11/1662 |
| | | | | 714/4.11 |
| 2014/0149793 | A1* | 5/2014 | Zaslavsky | G06F 9/45533 |
| | | | | 714/19 |
| 2014/0172803 | A1* | 6/2014 | Diaconu | G06F 17/30088 |
| | | | | 707/649 |
| 2014/0280020 | A1* | 9/2014 | Singamshetty | G06F 17/30445 |
| | | | | 707/714 |

OTHER PUBLICATIONS

International Business Machines Corporation; "Connection Management Through the Connection Manager"; IBM Knowledge Center; <https://www.ibm.com/support/knowledgecenter/SSGU8G_12.1.0/com.ibm.admin.doc/ids_admin_1176.htm>.
International Business Machines Corporation; "Operation of automatic client reroute for connections to DB2 for Linux, UNIX, and Windows from non-Java clients", IBM Knowledge Center; <https://www.ibm.com/support/knowledgecenter/SSEPGG_9.7.0/com.ibm.db2.luw.apdv.cli.doc/doc/c0056198.html>.
Mell, Peter, et al., The NIST Definition of Cloud Computing, National Institute of Standards and Technology, Oct. 7, 2009, Version 15, NIST, Gaithersburg, MD, US.

* cited by examiner

APPLICATION RESILIENCY MANAGEMENT USING A DATABASE DRIVER

BACKGROUND

This disclosure relates generally to computer systems and, more particularly, relates to using a database driver to manage application resiliency with respect to a shared pool of configurable computing resources. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to using a driver to maintain processing continuity in a shared disk architecture database without data replication such as multiple copies of data in multiple locations. The shared disk architecture database may allow for a plurality of assets to process database requests against a single shared copy of the database. A database driver can collect a set of command data such as ordered structured query language statements in memory on a request-by-request basis. In response to an error event, the set of command data may be replayed by the database driver without user or originating-application intervention or interruption. As such, the originating-application may not need to develop or provide logic to handle non-committed transactions for error events such as failovers in various environments such as a cloud environment.

Disclosed aspects relate to using a database driver to manage application resiliency with respect to a shared pool of configurable computing resources. A transaction request having a set of command data is received. The set of command data for the transaction request is captured in a memory device coupled with the database driver. The transaction request is connected with a first asset of the shared pool of configurable computing resources. An error event is detected related to the first asset. It is ascertained that the error event indicates a configuration for an automatic client reroute (ACR) operation. Using the ACR operation, the transaction request is connected with a second asset of the shared pool of configurable computing resources. The set of command data for the transaction request is transmitted from the memory device coupled with the database driver to the second asset.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
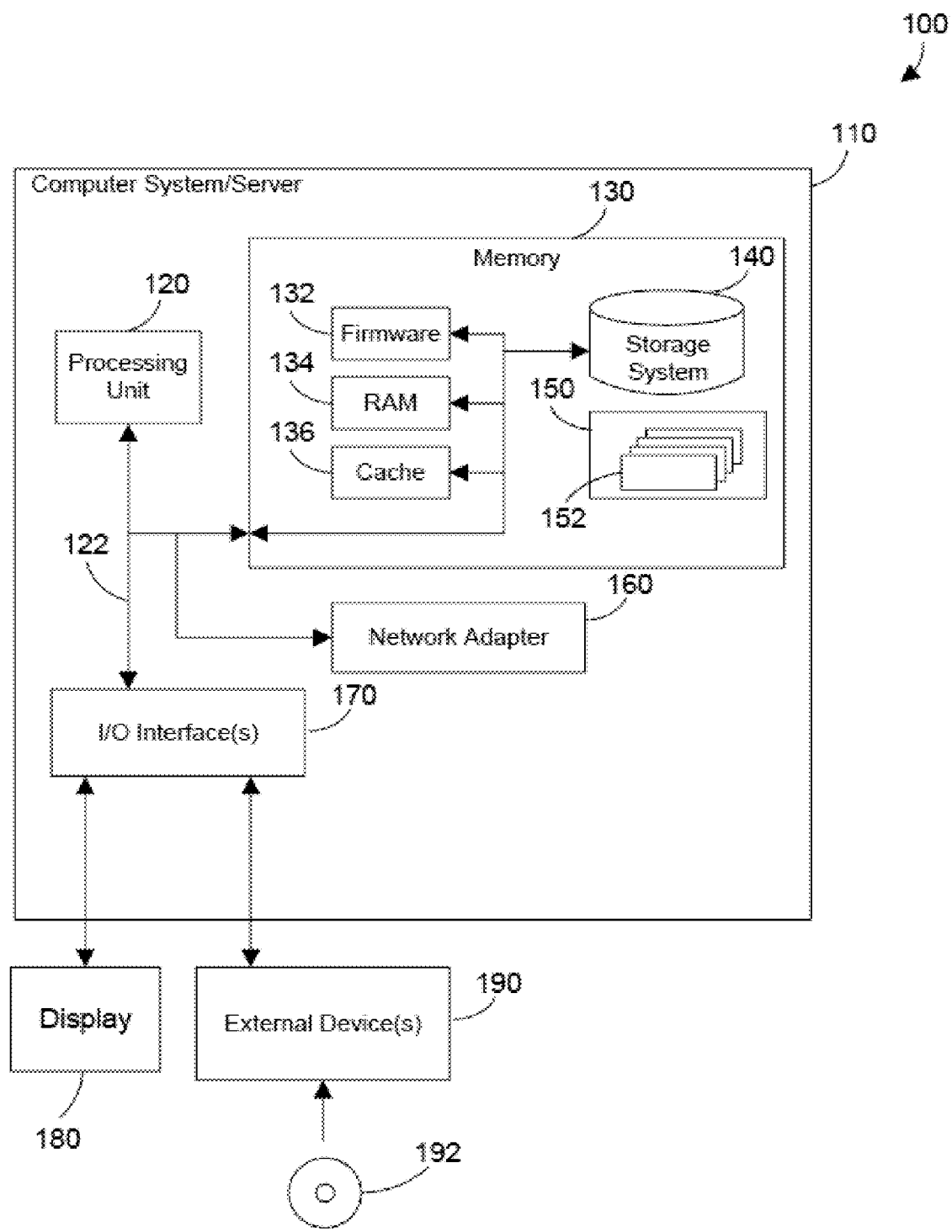
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to using a driver to maintain processing continuity in a shared disk architecture database without data replication such as multiple copies of data in multiple locations. The shared disk architecture database may allow for a plurality of assets to process database requests against a single shared copy of the database. A database driver can collect a set of command data such as ordered structured query language statements in memory on a request-by-request basis. In response to an error event, the set of command data may be replayed by the database driver without user or originating-application intervention. As such, the originating-application may not need to develop or provide logic to handle non-committed transactions for error events such as failovers in various environments such as a cloud environment.

Aspects of the disclosure include a computer-implemented method, system, and computer program product of using a database driver to manage application resiliency with respect to a shared pool of configurable computing resources. The database driver may be utilized to perform one or more (e.g., a portion, each/all) of the operational steps. A transaction request having a set of command data is received. The set of command data for the transaction request is captured in a memory device coupled with the database driver. The transaction request is connected with a first asset of the shared pool of configurable computing resources. The connection may be made for the purpose of processing the transaction request. An error event is detected related to the first asset of the shared pool of configurable computing resources. It is ascertained that the error event indicates a configuration for an automatic client reroute (ACR) operation. Using the ACR operation, the transaction request is connected with a second asset of the shared pool of configurable computing resources (in order to process the transaction request). The set of command data for the transaction request is transmitted from the memory device coupled with the database driver to the second asset of the shared pool of configurable computing resources (so as to process the transaction request).

In embodiments, the set of command data includes structured query language (SQL) data. In various embodiments, a determination is made of a successful execution of the transaction request with respect to the second asset of the shared pool of configurable computing resources. Accordingly, the set of command data for the transaction request may be removed from the memory device coupled with the database driver. Altogether, performance or efficiency benefits related to using a database driver to manage application resiliency with respect to a shared pool of configurable computing resources may occur (e.g., speed, flexibility, load balancing, responsiveness, high availability, resource usage, productivity). Aspects may save computing resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
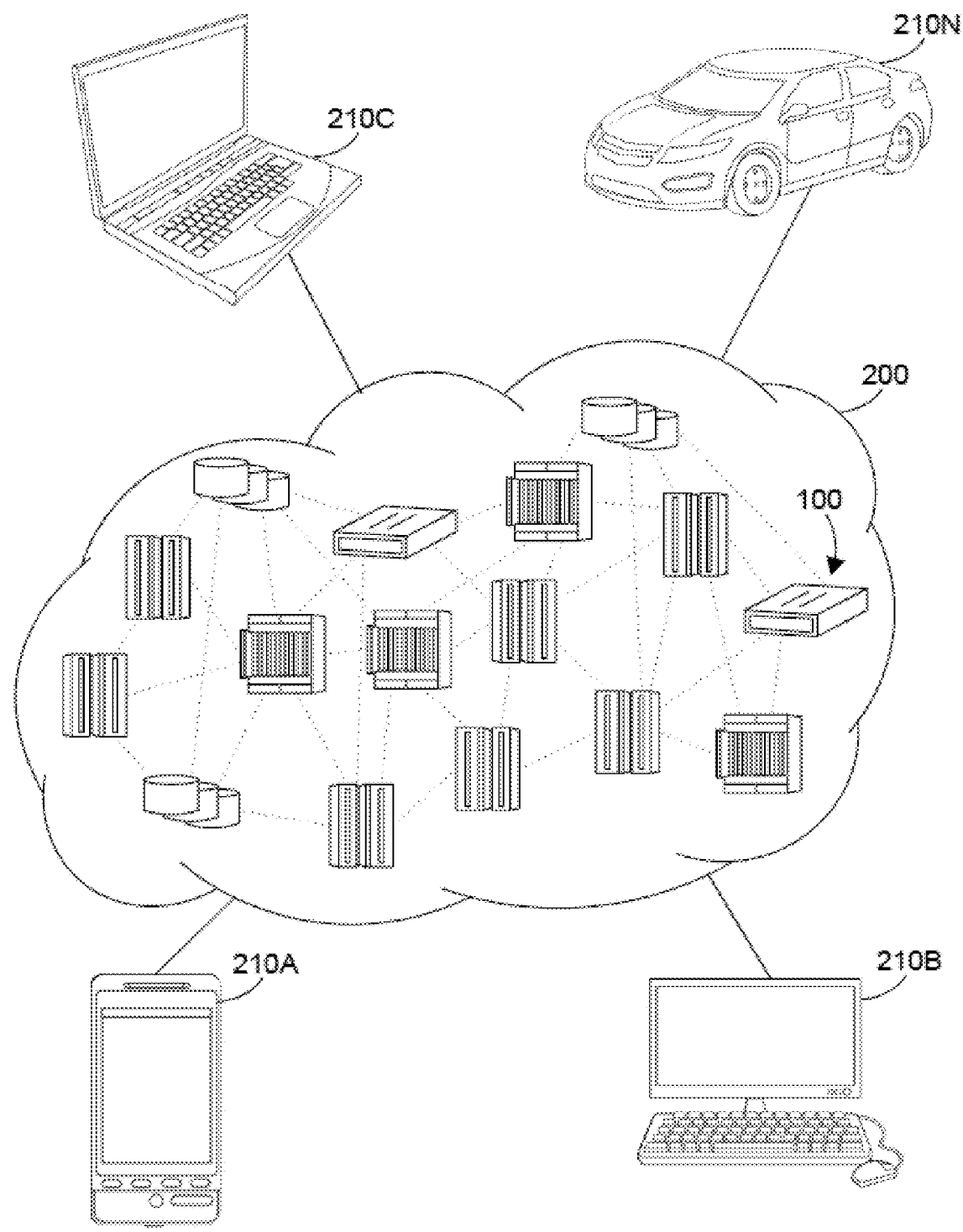
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
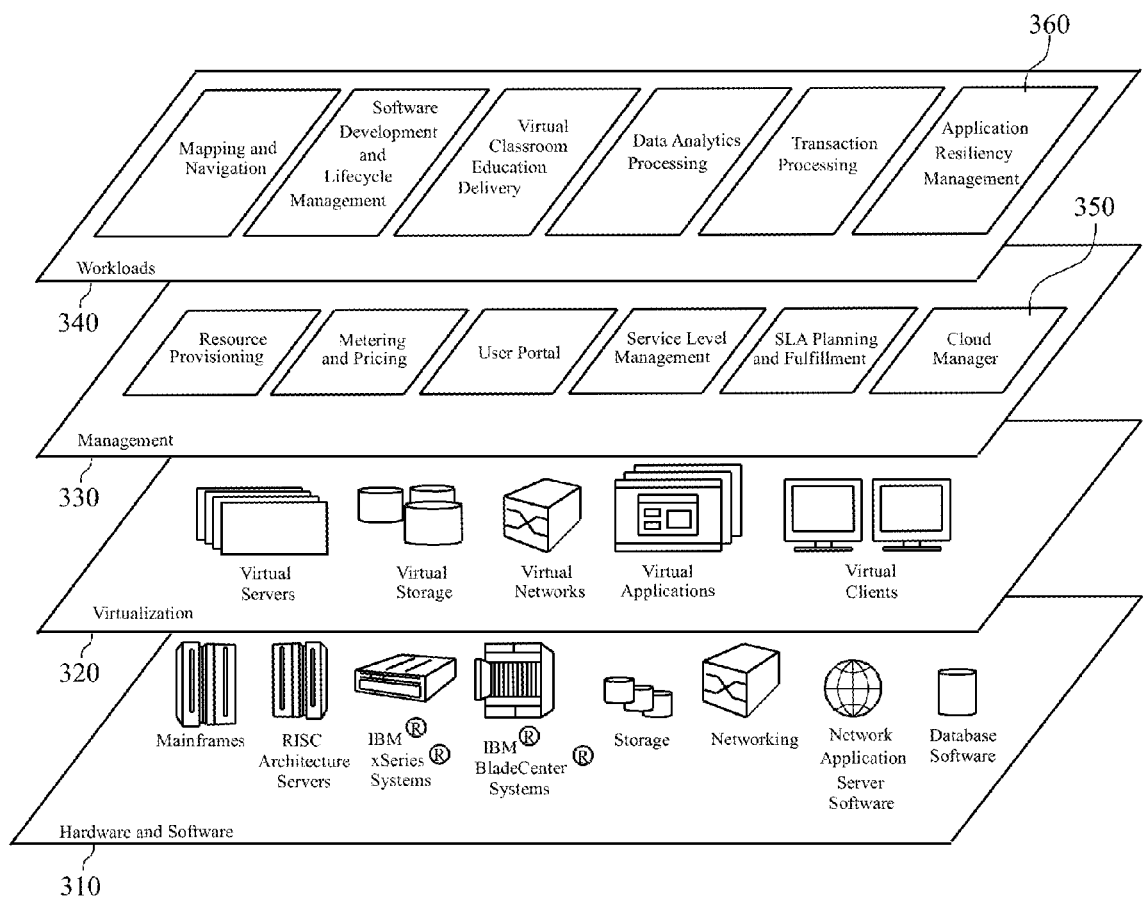
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an application resiliency management layer 360, which relates to using a database driver as discussed in more detail herein.

Figure 4:
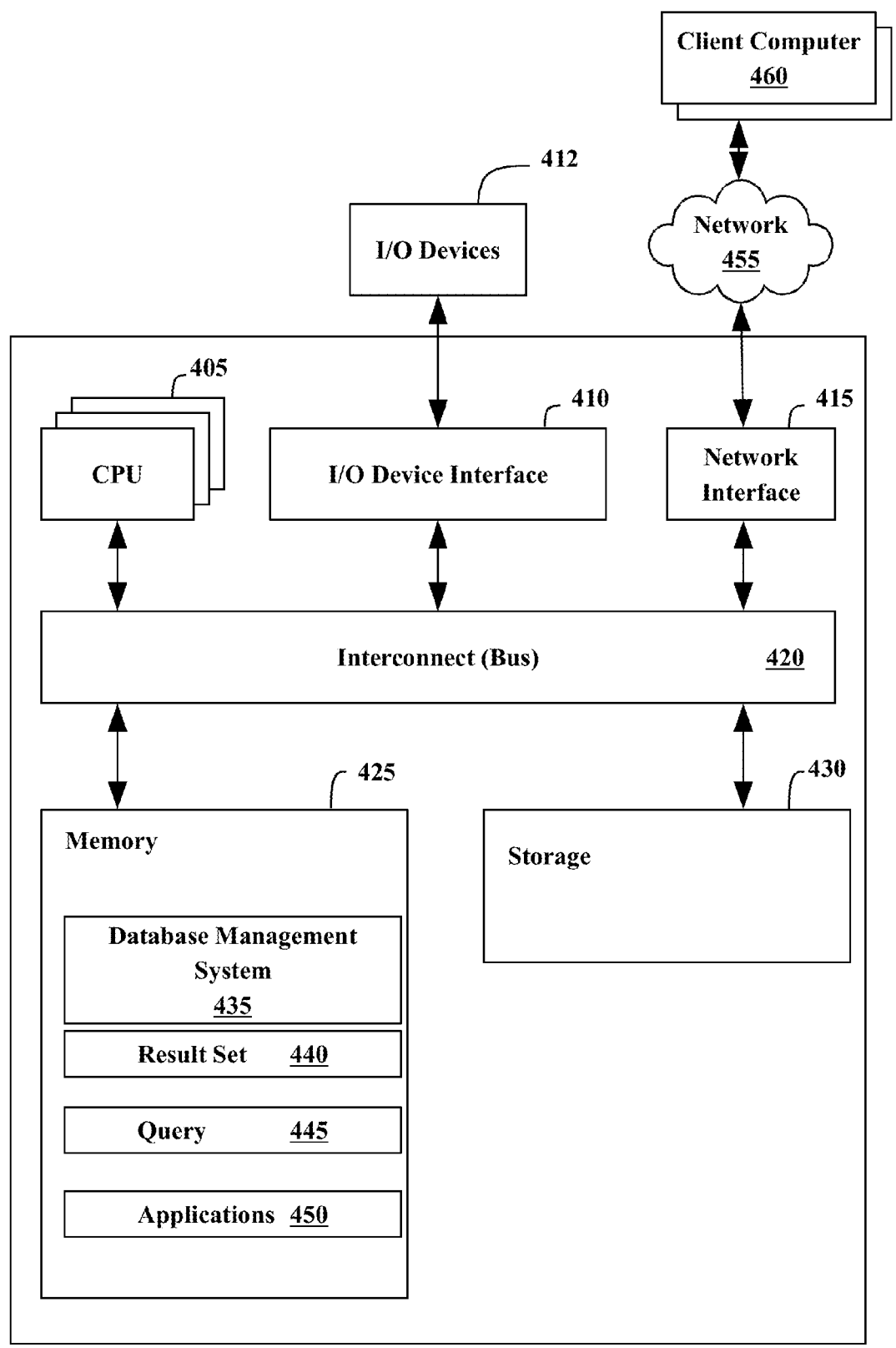
FIG. 4 illustrates an example representation of a computer system connected to a client computer via a network according to embodiments.

FIG. 4 illustrates an example representation of a computer system 400 connected to one or more client computers 460 via a network 455, according to some embodiments. For the purposes of this disclosure, computer system 400 may represent practically any type of computer, computer system, or other programmable electronic device, including but not limited to, a client computer, a server computer, a portable computer, a handheld computer, an embedded controller, etc. In some embodiments, computer system 400 may be implemented using one or more networked computers, e.g., in a cluster or other distributed computing system.

The computer system 400 may include, without limitation, one or more processors (CPUs) 105, a network interface 415, an interconnect 420, a memory 425, and a storage 430. The computer system 400 may also include an I/O device interface 410 used to connect I/O devices 412, e.g., keyboard, display, and mouse devices, to the computer system 400.

Each processor 405 may retrieve and execute programming instructions stored in the memory 425 or storage 430. Similarly, the processor 405 may store and retrieve application data residing in the memory 425. The interconnect 420 may transmit programming instructions and application data between each processor 405, I/O device interface 410, network interface 415, memory 425, and storage 430. The interconnect 420 may be one or more busses. The processor 405 may be a single central processing unit (CPU), multiple CPUs, or a single CPU having multiple processing cores in various embodiments. In one embodiment, a processor 405 may be a digital signal processor (DSP).

The memory 425 may be representative of a random access memory, e.g., Static Random Access Memory (SRAM), Dynamic Random Access Memory (DRAM), read-only memory, or flash memory. The storage 430 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 415 may be configured to transmit data via the communications network 455.

The memory 425 may include a database management system (DBMS) 435, a result set 440, a query 445, and applications 450. Although these elements are illustrated as residing in the memory 425, any of the elements, or combinations thereof, may reside in the storage 430 or partially in the memory 425 and partially in the storage 430. Each of these elements will be described in greater detail in accordance with FIG. 5.

The network 455 may be any suitable network or combination of networks and may support any appropriate protocol suitable for communication of data and/or code to/from the server computer system 400 and the client computer system 460. In some embodiments, the network 455 may support wireless communications. In other embodiments, the network 455 may support hardwired communications. The network 455 may be the Internet and may support Internet Protocol in some embodiments. In other embodiments, the network 455 may be implemented as a local area network (LAN) or a wide area network (WAN). The network 455 may also be implemented as a cellular data network. Although the network 455 is shown as a single network in the figures, one or more networks of the same or different types may be included.

The client computer system 460 may include some or all of the hardware and software elements of the computer system 400 previously described. As shown, there may be one or more client computers 460 connected to the computer system 400 via the network 455. In some embodiments, one or more client computers 460 may send a query 445 by network 455 to computer system 400 and receive a result set 440.

Figure 5:
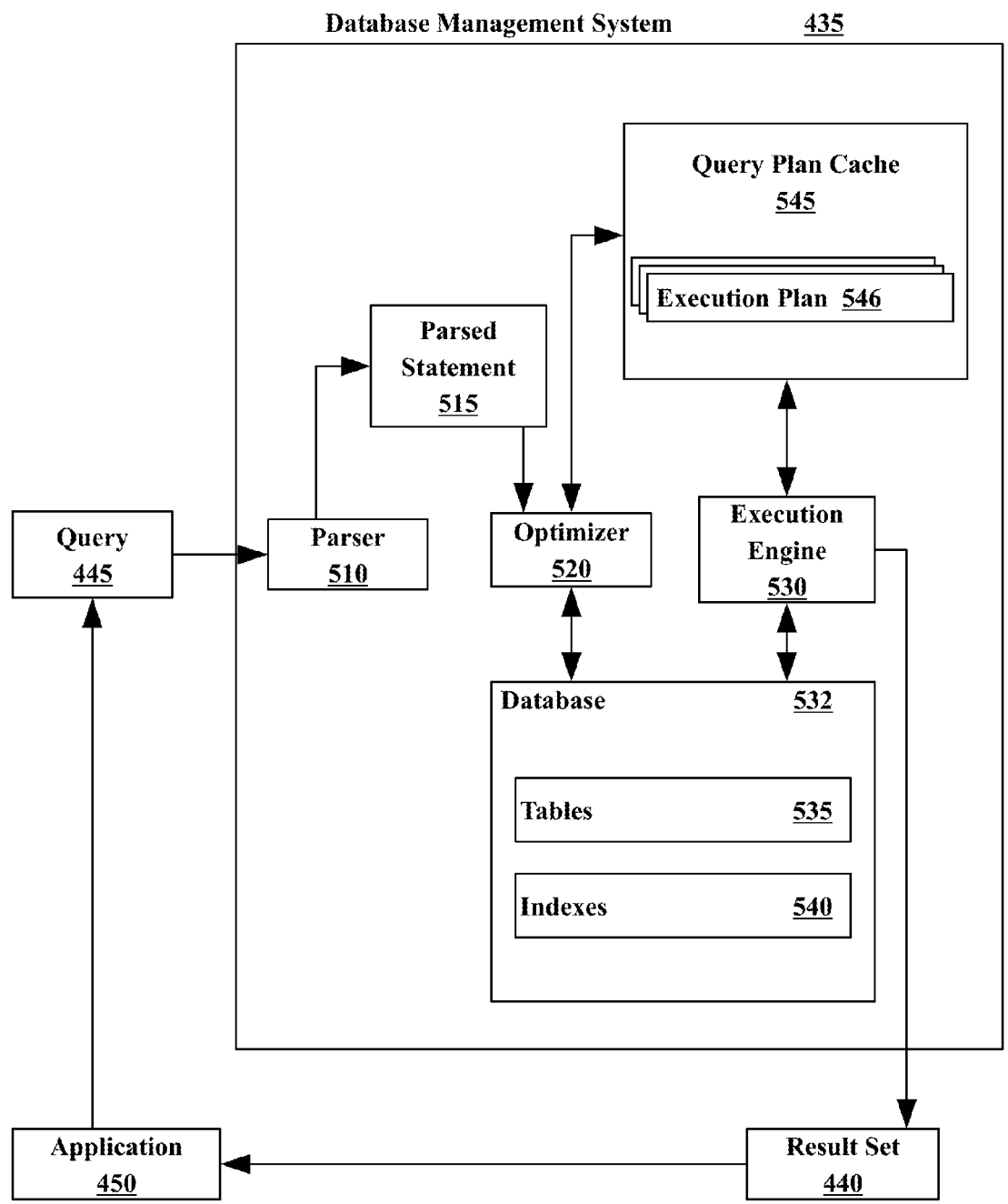
FIG. 5 illustrates an example database management system (DBMS) according to embodiments.

FIG. 5 illustrates an example database management system (DBMS) 435. The DBMS 435 may include a parser 510, an optimizer 520, an execution engine 530, and a database 532. The parser 510 may receive a database query 445 from an application 450. In some embodiments, the database query 445 may be in the form of a Structured Query Language (SQL) statement. The parser 510 may generate a parsed statement 515. The parser 510 may send the parsed statement 515 to an optimizer 520. The optimizer 520 may attempt to optimize the parsed statement. In some embodiments, optimizing may improve the performance of the database query 445 by, for example, reducing the amount of time it takes to provide a user with a response. The optimizer 520 may generate an execution plan 546 (may also be referred to as a query plan or an access plan), which may be maintained in a query plan cache 545, according to some embodiments. The query plan cache 545 may include one or more execution plans 546, including the current execution plan as well as previously used execution plans. Once an execution plan 546 is generated, the execution plan 546 may be sent to the execution engine 530. The execution engine 530 may execute the query 445. Executing the query 445 may include finding and retrieving data in the database tables 535 that satisfies the criteria supplied in the query 445. The execution engine 530 may store the data returned matching the query 445 in a result set 440. The DBMS 435 may return the result set 440 to an application 450, such as the application in which the database query 445 was generated, as a response to the database query 445.

A database 532 may include one or more tables 535 and, in some embodiments, one or more indexes 540. A database table 535 may organize data into rows and columns. Each row of a database table 535 may correspond to an individual entry, a tuple, or a record in the database 532. A column may define what is stored in each entry, tuple, or record. In some embodiments, columns of a table 535 may also be referred to as fields or attributes. Each table 535 within the database 532 may have a unique name. Each column within a table 535 may also have a unique name. A row, tuple, or record, however, within a particular table 535 may not be unique, according to some embodiments. A database 532 may also include one or more indexes 540. An index 540 may be a data structure that may inform the DBMS 435 of the location of a particular record within a table 535 if given a particular indexed column value. In some embodiments, the execution engine 530 may use the one or more indexes 540 to locate data within a table 535. In other embodiments, the execution engine 530 may scan the tables 535 without using an index 540.

As mentioned herein, the optimizer 520 creates the query access plan. The optimizer 520 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 6:
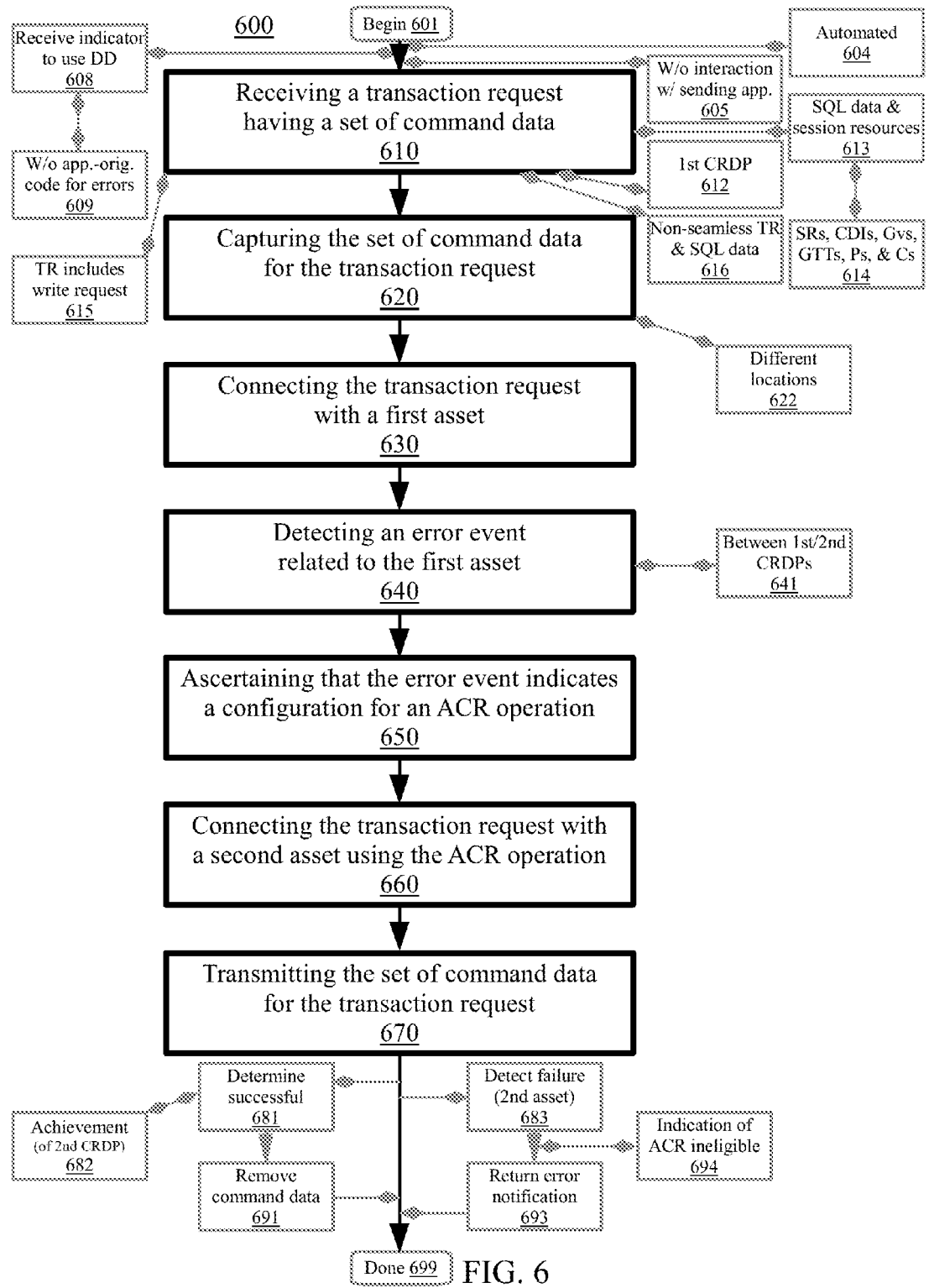
FIG. 6 is a flowchart illustrating a method of using a database driver to manage application resiliency with respect to a shared pool of configurable computing resources, according to embodiments.

FIG. 6 is a flowchart illustrating a method 600 of using a database driver to manage application resiliency with respect to a shared pool of configurable computing resources, according to embodiments. The method may begin at block 601. The database driver may be utilized to perform one or more (e.g., a portion, each/all) of the operational steps. The database driver may be a specially configured Open Database Connectivity (ODBC) application programming interface (API), Java Database Connectivity (JDBC) API, or the like.

In embodiments, the operational steps (e.g., the receiving, the capturing, the connecting, the detecting, the ascertaining, the connecting, the transmitting) each occur in an automated fashion (e.g., automatically by a computer) without user/manual intervention at block 604. In various embodiments, the operational steps each occur without interaction with an application which sent the transaction request at block 605 (e.g., without further/more-direct interaction than simply accepting the transaction request). Accordingly, the application which sent the transaction request may not need its user(s) or computing resources being utilized (e.g., by being made aware, by being notified, by requesting an action) with respect to a connection reroute to a different asset or the like.

At block 610, a transaction request having a set of command data is received (e.g., by the database driver). Receiving can include obtaining, collecting, acquiring, or otherwise accepting delivery of the transaction request. Aspects described herein may provide application resiliency solution for seamless failovers of various types of transactions, including for failures at various points (e.g., any point) during an executing transaction (e.g., beyond only failures on transaction boundaries, beyond only when read-only work has been previously performed). The transaction request can include a write request (e.g., new data inputs, deletion of data) at block 615. Accordingly, aspects described herein may operate subsequent to performing at least a portion of the write request on a first asset (see below). In embodiments, the transaction request includes a non-seamless transaction request at block 616. The non-seamless transaction request may include a set of implementation code configured to run command data that generally cannot be seamlessly replayed without user/manual intervention on a new/different compute node in response to an error event to an initial compute node (e.g., the non-seamless transaction request does not include code for such automated replay operations).

The set of command data can include various database commands that affect the state of the database session or the executing transaction. In embodiments, the set of command data includes a set of ordered Structured Query Language (SQL) data (e.g., SQL commands/statements/parameters/inputs/values) at block 616. As such, a set of ordered SQL data may be received by the database driver shall receive from an application. Other forms of database commands such as driver application programming interface (API) calls or commands which configure session resources (e.g., special registers) may be received. Accordingly, various types of commands/statements/parameters/code are considered with respect to the set of command data as received from a client application.

In embodiments, the set of command data begins at a first commit-rollback data-point at block 612. For example, the first commit-rollback data-point may be a first SQL statement. In embodiments, the set of command data includes a set of session resources at block 613. In certain embodiments, the set of session resources includes a set of special registers (e.g., having a specific control or data handling task to carry out), a set of client device information (e.g., state information, authentication information, security information, optimization information, network access information), a set of global variables (e.g., accessible across the shared pool), a set of global temporary tables (e.g., a current table for only a current session with extensive availability), a set of properties (e.g., parameter values, processor usage allocations, memory usage allocations), and a set of configurations (e.g., overall processing capability, overall memory capability) at block 614.

In embodiments, an indication to use the database driver to manage application resiliency is received at block 608 (e.g., received in a package with the transaction request, received from a user separate from the transaction request as applied to transaction requests which meet a predetermined selection). The indication may be received in advance of capturing the set of command data for the transaction request. Accordingly, a selection may be made to enable management of application resiliency as described herein. Selection can include, for example, saving a data value (e.g., entering a digit/character in a data store), transmitting a data object (e.g., sending an object having metadata), routing a message (e.g., publishing a start-up/wait expectation), or providing/performing/processing an operation (e.g., a notification). The database driver may make the selection (e.g., based on the indication received, by the database driver accepting the indication).

In various embodiments, the indication to use the database driver to manage application resiliency may be without a set of application-originated code to handle the error event at block 609. For example, the set of application-originated code may not be configured or designed to properly respond to a connection outage. As such, aspects described herein may utilize the database driver to properly respond to the connection outage (e.g., ensure data transfer occur, ensure computing processes are completed) regardless of the contents of the set of application-originated code (e.g., without requiring such error event handling in the contents of the set of application-originated code).

At block 620, the set of command data for the transaction request is captured. The set of command data for the transaction request may be captured in a memory device coupled with the database driver. The database driver may perform (e.g., carry-out, execute) the capture. Capturing can include collecting, accumulating, acquiring, aggregating, gathering, storing, logging, or recording. In certain embodiments, the memory device may include a volatile memory, a flash memory, or the like. In embodiments, the set of command data may be captured from the first commit-rollback data-point (e.g., the last/most-recent commit-rollback data-point from which command data may need to be replayed in order to process all of what the application has requested to be processed without a gap in processing). For example, SQL transactions with session resources may be captured in the memory device by the database driver from the last/most-recent commit/rollback location. For instance, a prepare statement with parameters markers having values can pass through application buffers with various properties (e.g., setInt, setString). To further illustrate, consider the example command data that follows:

[Thread:Thread-14][DB2XADataSource@d6f38113] getXAConnection(admf001, <escaped>) called,

[Thread:Thread-14] [com.xyz.db2.jcc.t4.T4XAConnection@dd73b1cb],

[Thread:Thread-14] [Connection@dd73b1cb]createStatement ( ) returned Statement@d5f8db26,

[Thread:Thread-14][Connection@dd73b1cb]setClientInfo (ClientHostname, sjwkstn1), or

[Thread:Thread-14][Statement@d5f8db26]executeQuery (SELECT count(*) from sysxyz.sysfoobar1).

In embodiments, the memory device coupled with the database driver is located at a first physical location at block 622. The first physical location may differ from (e.g., be physically separate from) a set of (physical) locations having the shared pool of configurable computing resources. For example, the database driver may be located in a first time zone (e.g., Pacific Time in San Francisco) and the shared pool of configurable computing resources may be located in a second time zone (e.g., Central Time in Chicago).

At block 630, the transaction request is connected with/to a first asset of the shared pool of configurable computing resources. Connecting can include linking, associating, calling, pinging, uploading, downloading, establishing a data transfer pipeline, configuring a transmission protocol, or the like. A cloud manager may have selected the first asset according to a predefined algorithm. The first asset may include a first physical compute node (or group of compute nodes), a first virtual machine (or group of virtual machines), or the like. The connection is made in order for the first asset to be used for processing of the transaction request. The database driver may perform the connection.

At block 640, an error event is detected. The error event is related to the first asset of the shared pool of configurable computing resources. For example, the first asset may have failed or may include a (potential/forecasted) error indicator (e.g., a first compute node is unresponsive or went offline such as due to power loss, a memory element of a memory device has been flagged as not working properly, a processor core is at risk of failure due to overheating). Detecting can include recognizing, discovering, sensing, or identifying the error event. The database driver may perform the detection via various monitoring methodologies (e.g., pinging the first asset, subscription to a publication of the cloud manager which indicates status of assets of the shared pool).

In embodiments, the error event occurs at block 641 between a first commit-rollback data-point and a second commit-rollback data-point (e.g., at an n-th SQL statement in a unit of work). As such, the error event may occur at a non-boundary point. Put differently, the error event can occur in the middle of a processing operation such as an access operation (e.g., a write, a read). Accordingly, aspects described herein may provide performance or efficiency benefits by reducing a need for a replay operation involving the application which originated the transaction request (e.g., subsequent to a notification of the application which originated the transaction request, subsequent to user intervention). As described herein, the database driver may handle the error event between the first and second commit-rollback data-points (which may include a write access that occurred between the first commit-rollback data-point and a point of the error event) in an automated fashion without invoking the application which originated the transaction request or a user.

At block 650, it is ascertained that the error event indicates a configuration for an automatic client reroute (ACR) operation. Ascertaining can include determining, identifying, resolving, evaluating, or performing a comparison. The database driver may perform the ascertainment. The ascertainment may be based on an error code with respect to the error event. The error code may be looked-up in an error code table. The error code table may indicate whether the error event is eligible for an ACR operation (e.g., the ACR operation may succeed at least a threshold percentage of the time). The ACR operation can provide failover support when a data server client loses connectivity to a first asset (e.g., a primary server for a database). ACR may enable the data server client to recover from a failure by attempting to reconnect to the database through a second asset (e.g., an alternate server for the database). For example, an error may only correspond with the first asset; as such, the configuration may be in place to perform the ACR operation to reroute the transaction request (or at least a portion of the set of command data) to another asset (e.g., the second asset) of the shared pool of configurable computing resources or the like.

At block 660, the transaction request is connected with/to a second asset of the shared pool of configurable computing resources to process the transaction request. The connection may be made using/based on the ACR operation. The connection is made in order for the second asset to be used for processing of the transaction request (e.g., in response to the error event related to the first asset of the shared pool of configurable computing resources which was previously tasked with processing of the transaction request). In certain embodiments, connection with a third asset of the shared pool of configurable computing resources may occur (e.g., the first and second assets are plagued by a same/similar error). The database driver may perform/make the connection.

At block 670, the set of command data (for the transaction request) is transmitted. Transmitting can include communicating, publishing, routing, sending, providing, presenting, displaying, or outputting. The transmission is from the memory device (coupled with the database driver) to the second asset (of the shared pool of configurable computing resources) and is performed in order to process the transaction request (e.g., in response to the error event or not being able to process the transaction request using the first asset). The database driver may perform the transmission. As such, the database driver may send the set of command data which was previously captured (e.g., to allow for processing of ordered data beginning at the first commit-rollback datapoint). Accordingly, the second asset may receive a data packet of the transaction request having the set of command data and initiate processing it.

For example, consider an application that routinely performs a batch of updates in a unit of work through issuing 10 SQL INSERT/UPDATE operations to various tables in a database. Assume one such application connection begins a unit of work. The application begins the transaction with a group of database commands to prepare session resources (e.g., configuring special registers). The application may begin to execute the SQL operations and successfully executes the first 4 SQL operations. When executing the fifth SQL operation, the connection fails with a client reroute eligible error (e.g., the asset of the shared asset to which connection is communicating goes down). The connection may be established to another available member and the database driver can use an in-memory transaction log to replay the session commands as well as all the SQL operations (e.g., 1 through 5) that remained uncommitted in the failed unit of work. Accordingly, the application continues to execute the remaining SQL operations in the unit of work without a burden related to the connection reroute or the SQL replay performed by the database driver.

In embodiments, a successful execution of the transaction request with respect to the second asset of the shared pool of configurable computing resources may be determined at block 681. Determining can include identifying, resolving, or evaluating. The successful execution of the transaction request can include achievement of execution to a second commit-rollback data-point (e.g., carrying-out each of an ordered set of command elements such as SQL statements from the first commit-rollback data-point to the second commit-rollback data-point by the second asset) at block 682. In response to the successful execution (e.g., receiving notification from the second asset of such success, not receiving an error notification from the second asset within a threshold period of time), the set of command data for the transaction request can be removed (e.g., cleared, flushed, deleted, discarded) from the memory device coupled with the database driver (e.g., to make room for a future set of command data related to a future transaction request thereby efficiently using computing resources such as memory by eliminating the set of command data up to the second commit-rollback data-point) at block 691 on a request-by-request basis (e.g., a single request at a time).

In various embodiments, a failure may be detected related to the second asset of the shared pool of configurable computing resources at block 683 (e.g., similar to detecting the error event related to the first asset as described herein). In response to detecting the failure, an error notification may be returned, delivered, presented, or otherwise provided (e.g., to a user, to the application which originated the transaction request) at block 693. In certain embodiments, it may be ascertained that the failure indicates an ineligibility for the ACR operation at block 694. The ineligibility may be indicated in the error notification. The indication can include a nature (e.g., corresponding to an error event code) of the ineligibility. Other possibilities are also considered.

Method 600 concludes at block 699. Aspects of method 600 may provide performance or efficiency benefits for managing application resiliency. For example, aspects of method 600 may have positive impacts with respect to a rate or quantity of successful transaction requests without burdening the application which originated the transaction request(s). Altogether, performance or efficiency benefits (e.g., speed, responsiveness, high availability, resource usage) may occur when using a database driver to manage application resiliency with respect to a shared pool of configurable computing resources.

Figure 7:
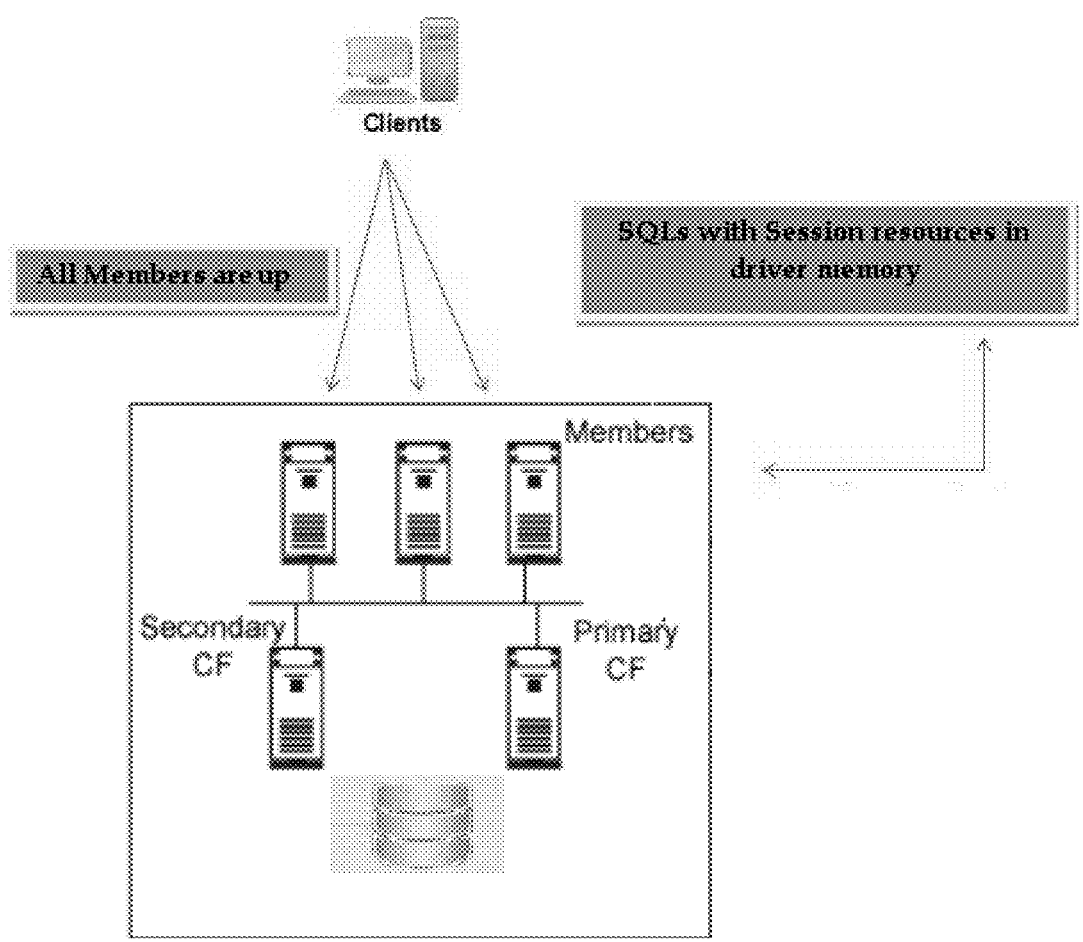
FIG. 7 is an example management system with respect to a shared pool of configurable computing resources, according to embodiments.

FIG. 7 is an example management system 700 with respect to a shared pool of configurable computing resources, according to embodiments. Aspects of method 600 may be may be utilized and applied to the example management system 700. A set of assets may be utilized such that a set of SQL data with session resources from an originating application can be distributed using a workload balancing algorithm at a database driver layer. The set of SQL data with session resources may be captured in a database driver memory.

Figure 8:
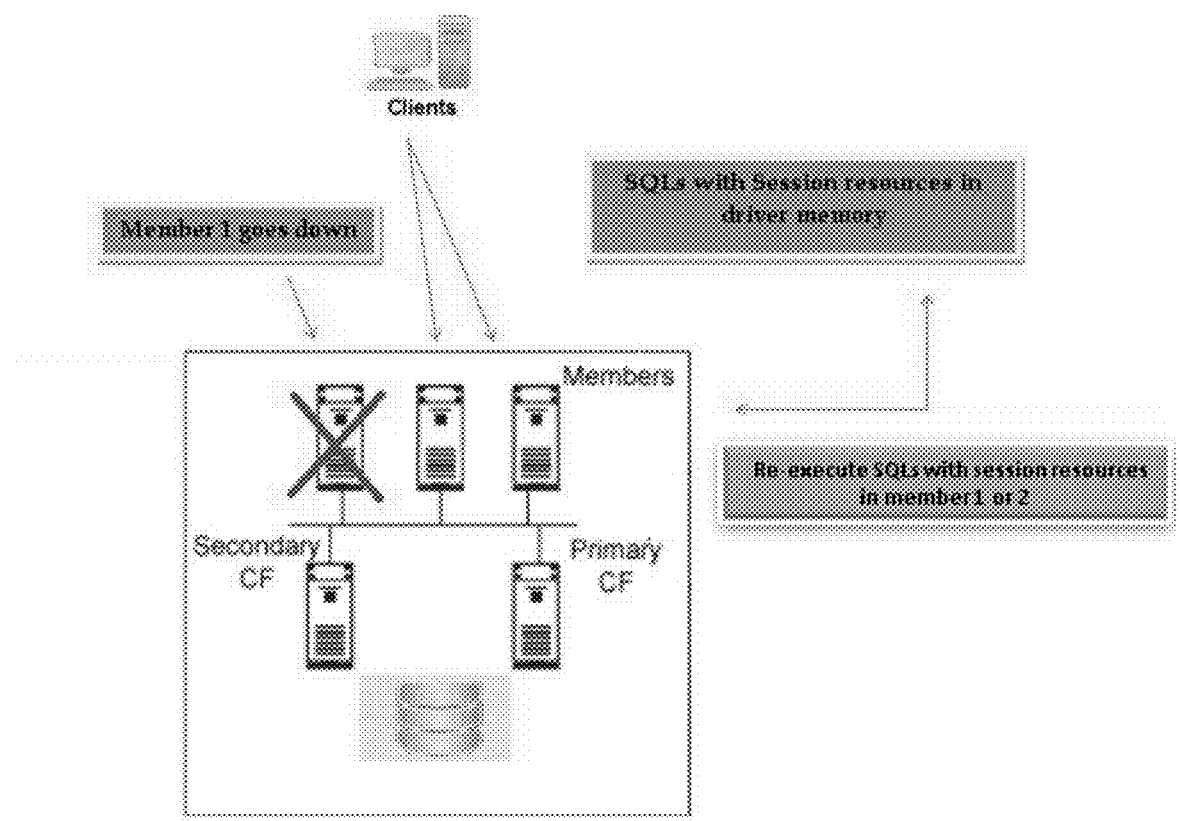
FIG. 8 is an example management system with respect to a shared pool of configurable computing resources, according to embodiments.

FIG. 8 is an example management system 800 with respect to a shared pool of configurable computing resources, according to embodiments. Aspects of method 600 may be may be utilized and applied to the example management system 800. A first asset may experience an error event (e.g., fail) during processing of a transaction request. The database driver may perform a connection failover to a second asset and initiate a (re-)execution of the set of SQL data with session resources again in the same order as it was captured from the last/most recent commit-rollback data-point in the database driver memory. If no commit-rollback data-point is in the database driver memory, the process may begin at a first SQL statement of the transaction request In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented of using a database driver to manage application resiliency with respect to a shared pool of configurable computing resources, the method comprising:
   receiving, by the database driver, a transaction request having a set of command data, wherein the transaction request includes a non-seamless transaction request, wherein the set of command resources comprises one or more units of work, and wherein a unit of work comprises the complete processing operation between a first commit-rollback data-point and a second commit-rollback data-point;
   capturing, in a memory device coupled with the database driver, the set of command data for the transaction request, wherein the command data comprises Structured Queried Language (SQL) operations and session resources for an initial a current unit of work, and wherein the session resources comprises a set of special registers, a set of client device information, a set of global variables, a set of global temporary tables, a set of properties, and a set of configurations;
   connecting the transaction request with a first asset of the shared pool of configurable computing resources to process the transaction request, wherein the shared pool of configurable computing resources is geographically disconnected from the database driver;
   detecting an error event related to the first asset of the shared pool of configurable computing resources, wherein the error occurs after a first operation within the current unit of work;
   ascertaining that the error event indicates a configuration for an automatic client reroute (ACR) operation;
   connecting, using the ACR operation, the transaction request with a second asset of the shared pool of configurable computing resources to process the transaction request, wherein connecting the transaction request to the second asset is done without user input, and wherein the second asset is selected based on a workload balancing algorithm;
   transmitting, from the memory device coupled with the database driver to the second asset of the shared pool of configurable computing resources to process the transaction request, the set of command data for the transaction request and session resources;
   determining a successful execution of the transaction request with respect to the second asset of the shared pool of configurable computing resources; and
   removing, from the memory device coupled with the database driver, the set of command data for the transaction request.

2. The method of claim 1, further comprising:
   receiving, in advance of capturing the set of command data for the transaction request, an indication to use the database driver to manage application resiliency.

3. The method of claim 2, wherein the indication to use the database driver to manage application resiliency is without a set of application-originated code to handle the error event.

4. The method of claim 1, wherein the transaction request includes a write request.

5. The method of claim 1, further comprising:
  detecting a failure related to the second asset of the shared pool of configurable computing resources; and
  returning an error notification.

6. The method of claim 5, further comprising:
  ascertaining that the failure indicates an ineligibility for the ACR operation.

7. The method of claim 1, wherein the capturing, the connecting, the detecting, the ascertaining, the connecting, and the transmitting each occur without interaction with an application which sent the transaction request.

8. The method of claim 1, wherein the receiving, the capturing, the connecting, the detecting, the ascertaining, the connecting, and the transmitting each occur in an automated fashion without user intervention.

9. A system of using a database driver to manage application resiliency with respect to a shared pool of configurable computing resources, the system comprising:
  a memory having a set of computer readable computer instructions, and
  a processor for executing the set of computer readable instructions, the set of computer readable instructions including:
    receiving, by the database driver, a transaction request having a set of command data, wherein the transaction request includes a non-seamless transaction request, wherein the set of command resources comprises one or more units of work, and wherein a unit of work comprises the complete processing operation between a first commit-rollback data-point and a second commit-rollback data-point;
    capturing, in a memory device coupled with the database driver, the set of command data for the transaction request, wherein the command data comprises Structured Queried Language (SQL) operations and session resources for an initial a current unit of work, and wherein the session resources comprises a set of special registers, a set of client device information, a set of global variables, a set of global temporary tables, a set of properties, and a set of configurations;
    connecting the transaction request with a first asset of the shared pool of configurable computing resources to process the transaction request, wherein the shared pool of configurable computing resources is geographically disconnected from the database driver;
    detecting an error event related to the first asset of the shared pool of configurable computing resources, wherein the error occurs after a first operation within the current unit of work;
    ascertaining that the error event indicates a configuration for an automatic client reroute (ACR) operation;
    connecting, using the ACR operation, the transaction request with a second asset of the shared pool of configurable computing resources to process the transaction request, wherein connecting the transaction request to the second asset is done without user input, and wherein the second asset is selected based on a workload balancing algorithm;
    transmitting, from the memory device coupled with the database driver to the second asset of the shared pool of configurable computing resources to process the transaction request, the set of command data for the transaction request and session resources;
    determining a successful execution of the transaction request with respect to the second asset of the shared pool of configurable computing resources; and
    removing, from the memory device coupled with the database driver, the set of command data for the transaction request.

10. A computer program product of using a database driver to manage application resiliency with respect to a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:
  receiving, by the database driver, a transaction request having a set of command data, wherein the transaction request includes a non-seamless transaction request, wherein the set of command resources comprises one or more units of work, and wherein a unit of work comprises the complete processing operation between a first commit-rollback data-point and a second commit-rollback data-point;
  capturing, in a memory device coupled with the database driver, the set of command data for the transaction request, wherein the command data comprises Structured Queried Language (SQL) operations and session resources for an initial a current unit of work, and wherein the session resources comprises a set of special registers, a set of client device information, a set of global variables, a set of global temporary tables, a set of properties, and a set of configurations;
  connecting the transaction request with a first asset of the shared pool of configurable computing resources to process the transaction request, wherein the shared pool of configurable computing resources is geographically disconnected from the database driver;
  detecting an error event related to the first asset of the shared pool of configurable computing resources, wherein the error occurs after a first operation within the current unit of work;
  ascertaining that the error event indicates a configuration for an automatic client reroute (ACR) operation;
  connecting, using the ACR operation, the transaction request with a second asset of the shared pool of configurable computing resources to process the transaction request, wherein connecting the transaction request to the second asset is done without user input, and wherein the second asset is selected based on a workload balancing algorithm;
  transmitting, from the memory device coupled with the database driver to the second asset of the shared pool of configurable computing resources to process the transaction request, the set of command data for the transaction request and session resources;
  determining a successful execution of the transaction request with respect to the second asset of the shared pool of configurable computing resources; and
  removing, from the memory device coupled with the database driver, the set of command data for the transaction request.

11. The computer program product of claim 10, wherein the program instructions are stored in a computer readable storage medium in a data processing system, and wherein the program instructions were downloaded over a network from a remote data processing system.

12. The computer program product of claim 10, wherein the program instructions are stored in the computer readable storage medium in a server data processing system, and wherein the program instructions are downloaded over a network to the remote data processing system for use in the computer readable storage medium with the remote data processing system.

\* \* \* \* \*